Patented Nov. 20, 1951

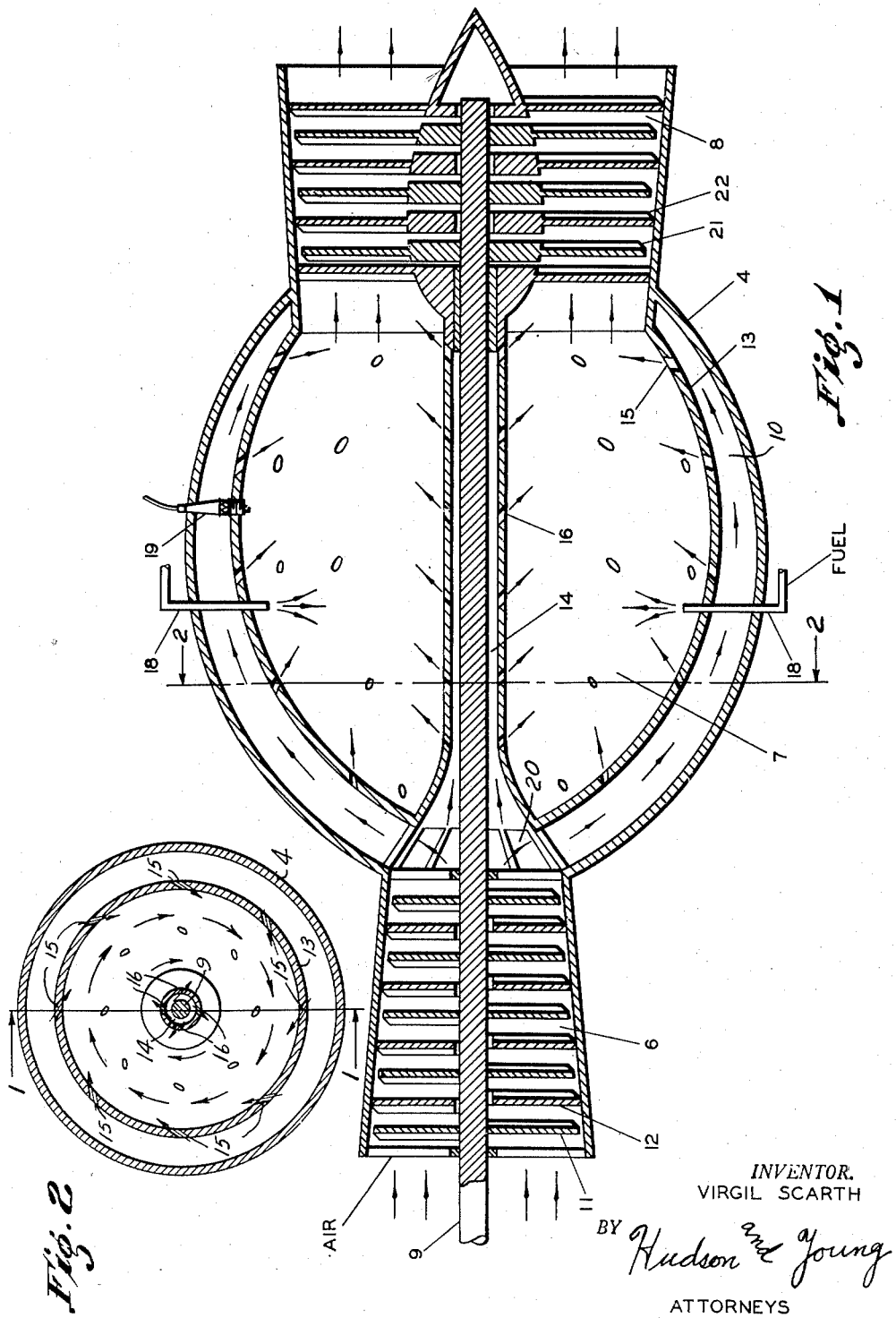

2,576,046

UNITED STATES PATENT OFFICE 2,576,046

DOUBLE-WALLED ANNULAR COMBUSTION CHAMBER WITH TURBINE SHAFT AIR JACKET

Virgil Scarth, Bartlesville, Okla., assignor to Phillips Petroleum Company, a corporation of Delaware Application April 29, 1946, Serial No. 665,813

2 Claims. (Cl. 60—39.65)

This invention relates to a power unit. In one aspect this invention relates to a combustion chamber designed for use in rockets, rocket planes and other aircraft in which continuous combustion of fuel takes place at a high temperature. In another aspect this invention relates to the protection of the compressor and turbine shaft of a jet-propulsion motor.

It has hitherto been necessary to make such combustion chambers of material which will withstand intense heat, and therefore natural refractory material has been frequently employed in their construction. Such materials, however, are heavy and are not suitable for the combustion chambers of gas turbines or rocket motors for use in aircraft intended to travel at high altitudes and at great speed, since every effort must be made to reduce their weight to the minimum. Such chambers are intended for generating driving gases by burning gas-forming combustible material, either solid, liquid or gases, under increased air pressure. As a result of such burning the chambers are subjected to excessive temperatures, pressures and other factors not encountered by other furnaces. In order to obtain the high pressures required in the combustion chamber for introduction of air therein, a portion of the energy of the gases expanding from the combustion chamber is utilized to compress the incoming air, usually by way of a centrally located shaft attached to an air compressor. This shaft must be made of high heat resistant material because of the excessive temperatures encountered by its proximity to the combustion chamber. It is much to be desired, therefore, to provide a method for protecting the surfaces of the combustion chamber and the compressor shaft.

It is an object of this invention to provide a novel apparatus for the combustion of fuels.

It is still another object of this invention to provide apparatus for protecting the compressor shaft of a jet-propulsion motor.

Still another object of this invention is to allow the construction of jet-propulsion motors and combustion chambers of less highly heat resistant and lighter materials.

Various other objects and advantages of this invention will become apparent to those skilled in the art from the accompanying description and disclosure.

The invention accordingly comprises the features of construction, combination of elements, and arrangement of parts, which will be exemplified in the construction hereinafter set forth and the scope of the invention will be indicated in the claims.

In the drawing:

Figure 1 of the drawing represents a diagrammatic illustration of a longitudinal cross section of a jet-propulsion motor with an air compressor according to this invention, taken on line 1—1 of Figure 2. Figure 2 represents a diagrammatic illustration of a cross-section of apparatus shown in Figure 1, taken on the line 2—2 thereof. Element 10 is a jacket or casing for combustion chamber 7 and comprises an inner wall 13 and a spaced outer wall 4 formed of relatively thin metal. Wall 4 of jacket 10 extends at both ends to form the shell of compressor 6 and the shell of turbine 8. The essential elements of the jet-propulsion motor comprise an axial flow air compressor 6, a combustion zone 7, an expansion turbine 8 and a centrally located cylindrical shaft 9 connecting compressor 6 and expansion turbine 8.

Compressor 6 comprises rotating blades 11 attached to a central shaft or axle 9 and stationary blades or vanes 12 attached to the outer wall 4 of jacket 10 of the jet-propulsion motor. In a similar manner expansion turbine 8 comprises rotating blades 21 attached to shaft 9 and stationary blades or nozzles 22 attached to shell 4. Turbine 8 is a multistage turbine. Combustion zone 7 is surrounded by air jacket 10. Shaft 9 connecting compressor 6 and turbine 8 passes through the center of combustion zone 7 and is protected from the hot combustion gases by air jacket 14 positioned around shaft 9, which is usually made integral with inner wall 13 of air jacket 10. Inner wall 13 and the wall of protecting air jacket 14 around shaft 9 are so constructed that air passing from compressor 6 into jacket 10 through openings 20 in the wall of jacket 14 and into jacket 14 must pass into combustion chamber 7 through tangentially directed holes or openings 15 and 16 in the walls of air jackets 10 and 14, respectively. The tangential direction of the holes through each of the aforesaid jackets 10 and 14 is preferably in the direction of the flow of the gases and so disposed to give the air a helical motion around shaft 9. Elements 18 are conventional fuel injection means. Element 19 is a conventional spark plug or the like for igniting the fuel and air mixture in combustion zone 7. The various elements of the propulsion motor are constructed of high alloys or alloy steels which are known to those skilled in the art.

Operation

In operating the jet-propulsion motor shown in the drawing, air is sucked or blown into compressor 6 in which it is compressed to a relatively high pressure, about 5 to 8 atmospheres or higher, by the rotation of blades 11 attached to shaft 9. Vane 12 directs the flow of air into the successive blades where it is compressed by stages. Air at a substantially higher pressure and temperature (400–600° F.) than the entering pressure and temperature passes from axial flow compressor 6 into outer jacket 10 and inner jacket 14. Compressed air is injected into combustion zone 7 through perforations 15 and 16 from the jackets surrounding combustion zone 7 and shaft 9. The continuous stream of air passing through the jackets 14 and 10 maintains shaft 9 and the walls of combustion zone 7 at a much lower temperature than would normally be realized in a conventional jet-propulsion combustion zone, generally below about 1000° F.

Suitable fuel, such as gasoline, is introduced into combustion zone 7 through conduits 18. The fuel-air mixture is ignited in combustion zone 7 by spark plug 19 and after ignition further use of spark plug 19 is unnecessary since there is a continuous burning in combustion zone 7. The products of combustion at a very high temperature, between about 1500 and about 2000° F., pass from combustion zone 7 into turbine 8 where the gases expand through stationary blades 22 against rotating blades 21 which rotate shaft 9 and blades 11 of compressor 6. The expansion of gases from expansion zone 8 into the atmosphere propels the object to which the jet-propulsion motor is attached.

While practicing the present invention temperatures of 2000 to 3000° F. which are normally imparted to the walls of combustion zone 7 are substantially reduced because of the insulation effect of the air in the jacket 13 and because of the blowing of the air through the perforations which maintains the flame front away from the walls of the combustion zone. The same phenomenon is noted with respect to the protective jacket 14 on shaft 9 since the air flowing through the jacket maintains the shaft cool and prevents the flame front from contacting the shaft. The cooling of shaft 9 is especially desirable since it is the most highly stressed member of the motor and because of its proximity to the highest temperature of the combustion zone 7.

In some instances it is possible to pass a fuel charge in admixture with air through compressor 6 and inject the fuel through the walls of the combustion zone as illustrated without departing from the scope of this invention. However, it is preferred to introduce the fuel through conduits 18 and the air through compressor 6 as shown. According to this invention not only is the surface of the combustion chamber cooled but a portion of the available heat from the combustion chamber is imparted to the air to preheat it prior to entry and combustion in zone 7. Such preheating of the air greatly increases the efficiency of the motor.

From the foregoing it is believed that the construction, operation and advantages of my invention will be readily comprehended by persons skilled in the art. It is to be clearly understood, however, that various changes in the apparatus set forth above may be made without departing from the scope of the invention, it being intended that all matters contained in the description or shown in the drawing shall be interpreted as illustrative only and not in a limiting sense.

Having described my invention, I claim:

1. A jet-propulsion power plant comprising in combination, a double-walled air-jacketed combustion chamber of annular cross-section immediately surrounding an axially positioned shaft in spaced-apart relation thereto so as to form an air jacket around said shaft, said shaft extending beyond the extremities of said combustion chamber at both ends and said air jackets being substantially unobstructed; an air compressor on one end of said shaft adjacent said combustion chamber in open communication with the jackets around said combustion chamber and said shaft for passage of air from said compressor to said jackets; an expansion turbine on the other end of said shaft adjacent the exhaust end of said combustion chamber comprising sets of stationary gas deflecting members alternating with sets of rotatable members fixed on said shaft and rotatable therewith when exhaust gases pass through said turbine; openings into said combustion chamber from the surrounding outer air jacket, said openings extending tangentially with respect to said chamber and toward said turbine and being disposed around the chamber in a plurality of spaced-apart rows in planes perpendicular to the axis of the chamber so as to direct gas in a helical path around said axis toward said turbine; openings into said combustion chamber from the inner air jacket surrounding said shaft, said openings extending tangentially with respect to said shaft and toward said turbine so as to cooperate with aforesaid openings in effecting helical gas flow in said chamber; and a plurality of fuel inlet means extending into said chamber for injecting fuel thereto.

2. A jet-propulsion power plant comprising in combination, a combustion chamber having an egg-shaped air-jacketed shell axially surrounding an air-jacketed shaft, the outer wall of said shell converging at one end to unite with a compressor shell enclosing a turbine type air compressor on said shaft and at the other end to unite with a turbine shell enclosing a multi-stage power turbine on said shaft; an outwardly flared section on the compressor end of the jacket surrounding said shaft providing for compression of air into said jacket; passageways in said flared section in communication between the shell jacket and the shaft jacket; openings in the inner wall of said shell jacket directed tangentially to said shaft and toward the power turbine, said openings being disposed around and along said wall so as to direct gas in a helical path around the shaft jacket toward said turbine; openings into said combustion chamber through said shaft jacket disposed along and around the jacket and directed tangentially thereto and toward the power turbine so as to cooperate with aforesaid openings in effecting helical gas flow; and conduits extending through the chamber jacket for injecting fuel into the combustion chamber.

VIRGIL SCARTH.

REFERENCES CITED

The following references are of record in the file of this patent:

UNITED STATES PATENTS

| Number | Name | Date |
|---|---|---|
| 2,110,209 | Engels | Mar. 8, 1938 |
| 2,216,731 | Birmann | Oct. 8, 1940 |
| 2,326,072 | Seippel | Aug. 3, 1943 |
| 2,398,654 | Lubbock et al. | Apr. 16, 1946 |
| 2,405,723 | Way | Aug. 13, 1946 |

OTHER REFERENCES

"The Junkers Jumo 004 Jet Engine" in Aircraft Engineering, Dec. 1945, pages 342–347, incl., and the loose leaf therewith.